A. J. THORNLEY.
CAR FENDER.
APPLICATION FILED APR. 29, 1909.
960,056.
Patented May 31, 1910.
2 SHEETS—SHEET 2.
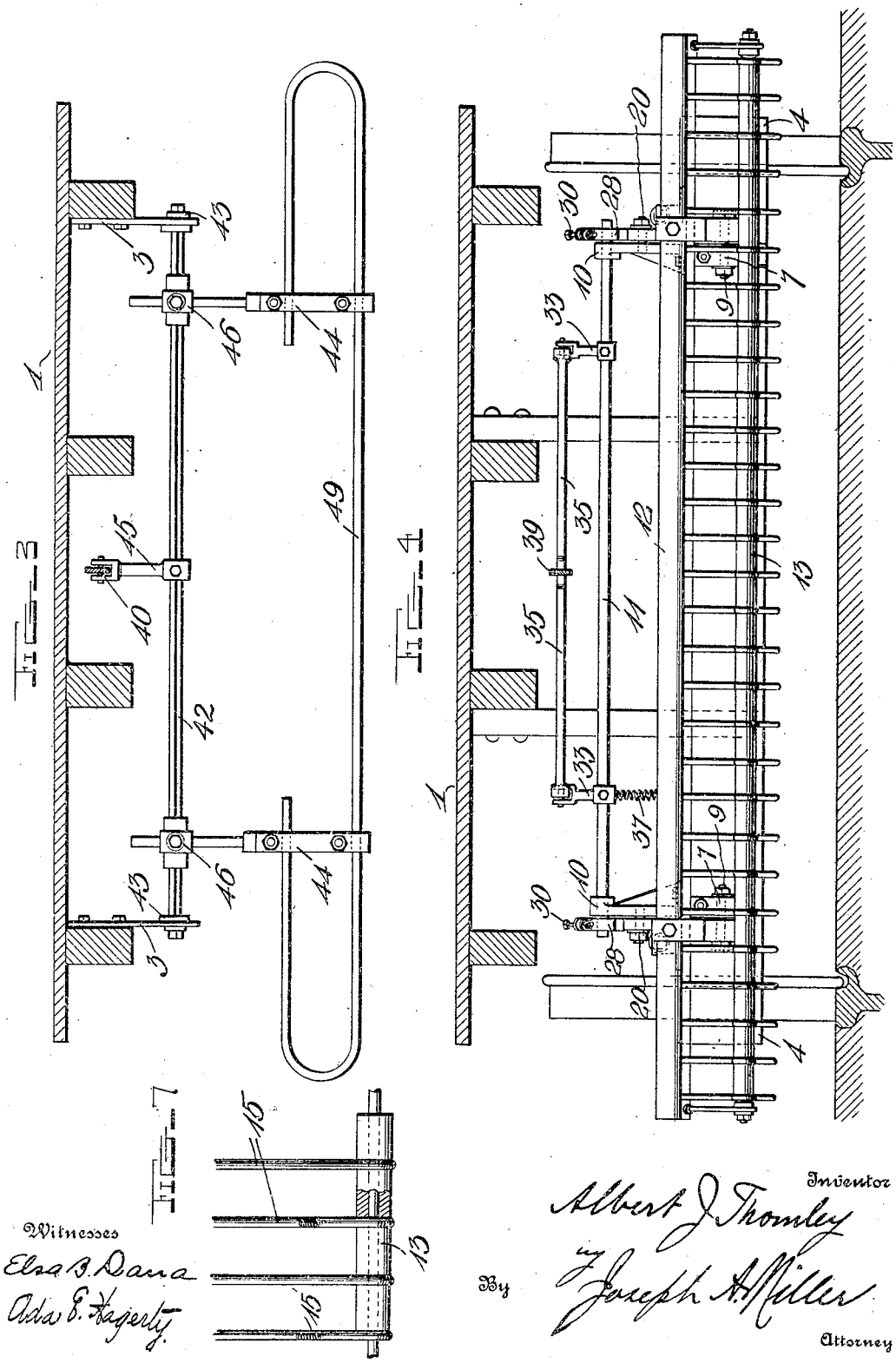

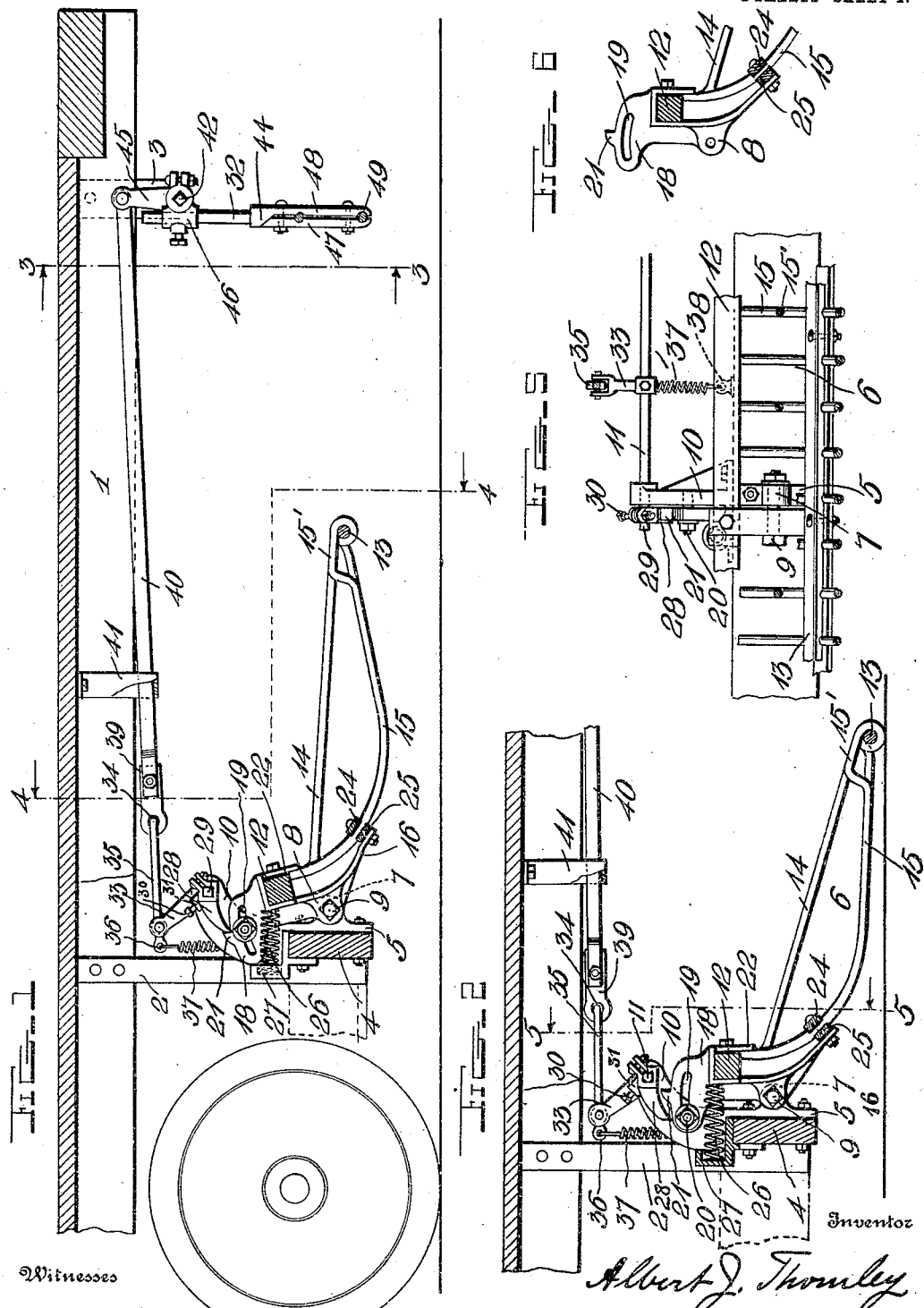

UNITED STATES PATENT OFFICE.

ALBERT J. THORNLEY, OF PAWTUCKET, RHODE ISLAND, ASSIGNOR TO CONSOLIDATED CAR FENDER COMPANY, OF PROVIDENCE, RHODE ISLAND, A CORPORATION OF RHODE ISLAND.

CAR-FENDER.

960,056.      Specification of Letters Patent.      Patented May 31, 1910.

Application filed April 29, 1909. Serial No. 492,816.

*To all whom it may concern:*

Be it known that I, ALBERT J. THORNLEY, a citizen of the United States, residing at Pawtucket, in the county of Providence and State of Rhode Island, have invented a new and useful Improvement in Car-Fenders, of which the following is a specification.

This invention relates to the class of wheel fenders for cars, and has more particular regard to those fenders which are located beneath the car body, and which are tripped or dropped from a normally raised position by means of a trip located near the front of the car body.

The object of this invention is to improve the general construction of wheel guard fenders of this class.

A further object of this invention is to provide a fender which will more readily and surely retain upon the fender portion objects which have been picked up.

Further, the object of this invention is to provide means for relieving the fender of the shock and jar due to the jolting and irregular running of the car under normal or ordinary running conditions, and to keep the fender raised against the pressure of a constant tension.

With these objects in view, and others, as will hereinafter appear, this device will now be fully set forth and described with reference to the accompanying drawings, in which—

Figure 1 is a longitudinal section of a car body with the fender attached thereto. Fig. 2 is a similar view of a portion of the fender in its lowered position. Fig. 3 is a vertical section on line 3 3 of Fig. 1. Fig. 4 is a similar view on line 4 4 of Fig. 1. Fig. 5 is a detail vertical section on line 5 5 of Fig. 2. Fig. 6 is a detail fragmentary section of a portion of the fender. Fig. 7 is a fragmentary plan view of the forward end of the fender, partly in section.

Referring more particularly to said drawings, in which like numerals indicate like parts throughout, 1 is the lower portion of a car body, the beams of which are provided with hangers 2 and 3, showing one means of supporting the wheel fender and trip. Secured to the lower ends of the hangers 2 by suitable means, as bolts and nuts, is a cross beam 4, to which are secured brackets 5 which carry the fender 6 and the release mechanism therefor, as hereinafter described. Said brackets 5 are secured to the front of the cross beam 4 in any suitable manner, preferably by bolts and nuts, and have journals 7 to which the bearings 8 of the fender are pivotally secured, as by shaft bolts 9. The upper portion of the brackets 5 overlap the top side of the cross beam 5 and terminate in enlarged, outwardly-curved members or projections 10, which carry in suitable journals, at the upper ends, a shaft 11. Said projections 10 may of course be formed as independent members and bolted or otherwise fastened to the top or side of the cross beam 4. Said fender 6 comprises a transverse bar 12 and a forward bar 13 which are joined by end rods 14 and the intermediate curved rods 15. The bar 12 has secured thereto the straps or frame pieces 16, by means of which the fender is secured to the brackets 5, and which extend over the transverse bar 12, where they are secured by bolts and nuts, and terminate in rearwardly-projecting members 18. Said members 18 are slotted, as at 19, and are slidably connected to the projections 10 of brackets 5 at 20. The member 18 is also provided, preferably at its upper edge, with a dog 21, which engages the trip mechanism as hereinafter described. The straps 16 are formed to inclose the bar 12 on its rear, top and front sides, the forward downwardly-projecting member 22 thereof extending below said bar to bear against and brace the curved intermediate member over which it projects. The straps 16 are also downwardly extended, and provided with a clamp comprising upper and lower grooved members 24 and 25, through which a bolt is entered and engages the strap 16 and the curved rod 15, thereby supporting and bracing said forwardly projecting curved member 15.

The curved rods 15, as above stated, extend between the transverse bar 12 and the forward bar 13, to the latter of which they are secured by wrapping the ends of the rods 15 to inclose said bar 13. Each alternate rod 15 is bent upwardly and outwardly, adjacent to the bar 13, to form a rise 15″. This series of rises, thus provided across the width of the fender provides an effective barrier to objects caught upon said fender and prevents their escape therefrom by rolling off over the bar 13.

Located above the cross beam 4 is a plurality of coil springs 26, preferably two in number. Said springs have one end carried in a box or casing 27 secured to said cross beam 4 and have their opposite ends bearing against the transverse bar 12, to exert a normal tension thereagainst. This affords a means for taking up and preventing the jolting and rattling of said fender due to the jarring and jerking of the car, when the fender is in its normal raised position, and gives a positive means for insuring the drop of the fender when released, by maintaining it under a constant pressure.

The means for holding and releasing the fender 6 are mounted on said shaft 11 and comprise pawls 28 suitably clamped on said shaft in position to engage and retain the dog 21 to hold the fender 6 in the elevated position. In the embodied form the said pawls 28 are shown provided with a split socket or opening which is provided with opposite arms, through which a tightening nut is entered for securing the pawl to the squared ends 29 of the shaft 11. Said sockets are further provided with a set screw 30, operating in threaded boxes 31, for affording additional fastening means, against the effects of wear and strain. Said shaft 11 is operated to raise the pawls 28 and release the fender 6 by means of connection with the trip 32. Said connection is effected as follows: Extending upwardly at a suitable angle from the shaft 11 are crank levers 33, which are spanned by a bar 34, having legs 35, which are pivotally secured to said crank levers 33 at a distance from the ends of said legs, said crank levers being preferably bifurcated to receive the legs 35 between slots formed therein. The projecting or extended end of one of the legs 35 is provided with an eye 36, to which is secured a spring 37, the opposite end of said spring being secured to the cross beam 4, as by eye-bolt 38. If desired, a spring may be tensioned to each of said legs 35, said springs serving to maintain and return the shaft 11 and its connected elements to their normal position.

Secured to the medial portion of the bar 34, by means of the pivoted link 39 is the rod 40, which is supported by and slidable in a hanger 41 and is pivotally secured to the trip 32. Said trip comprises a square shaft 42 having journals 43 which are mounted in bearings in the hangers 3, and carries a pair of depending clamp-brackets 44. A crank lever 45 is projected upwardly and has a bifurcated joint for connection with the above mentioned rod 40. Said clamp-brackets 44 are adjustably mounted in sockets 46 and are held in place by set-screws therein. The lower ends of said clamps consist of interfitting members 47 and 48. Said members are transversely grooved to receive the trip rod 49, and member 48 is wider than and incloses member 47 at its upper end, said member 48 being provided with beveled flanges at each side, which envelop the member 47. Bolts are entered through members 47 and 48 as a preferable means of clamping the two members. The trip rod 49 consists of a continuous length of metal and is formed at each end into a U, both arms of which are clamped by the clamp brackets 44, the intermediate joining portion of the trip-rod being disposed across between the lowest portions of the clamp brackets. This arrangement brings the rod into close proximity with the ground to obstruct the passage of any object below the car between the tracks or under the wheels.

The operation of the apparatus above set forth is as follows: The height of the trip rod 49 having been adjusted with relation to the ground, so as to conveniently catch objects or bodies which it is desirable to keep from under the car, and the fender having been raised until the pawls 28 engage behind the dog 21, against the tension of springs 26, the apparatus is ready for operation. When struck, as designed, by an object in the trackway, the trip 32 is swung or rocked on its shaft 42, and thereby rocks shaft 11 through the intermediate connections, and thereby raises pawls 28. This permits the fender 6 to drop to the ground, through the combined action of gravity and the springs 26. As soon as the pawls are released and the trip hangs free, the spring 37 acts to return the trip mechanism to position and the pawls 28 to position to engage dogs 21 of the fender 6, when the latter is lifted. It is evident that the springs 26 tend to maintain not only a tension on the fender to force it down when released, but act to prevent the jarring and jolting due to the irregular and jerky movements of the car.

It is obvious that the embodiment herein described is only a preferred form, and that the invention need not be limited to the details described; but that changes in construction may be made which still keep within the scope of the appended claims. It is also evident that in place of being secured to the car body by the hangers 2 the fender can be attached to the forward extension of the truck carriage 4′ indicated in broken lines in Figs. 1 and 2 and the hangers 2 dispensed with.

Having thus described my invention, I claim as new and desire to secure by Letters Patent—

1. A car fender, comprising a fender, means for holding said fender normally raised, and means for releasing said fender, said fender comprising front and rear transverse bars, side rods, and curved intermediate rods, alternate rods having elevations formed at their outer extremities to form a barrier along the front of the fender.

2. A car fender, comprising a fender, means for holding said fender normally raised, and means for releasing said fender, said fender comprising front and rear transverse bars, side rods, and curved intermediate rods, alternate rods having elevations formed to permit objects to roll easily on said fender but to obstruct their tendency to drop off therefrom.

3. A car fender, comprising a fender, means for holding said fender normally raised, and means for releasing said fender, said releasing means comprising a rotatable shaft having depending clamps, said clamps being vertically adjustable on said shaft, and carrying at their lower ends a transverse rod which is adapted to receive the blows of objects to trip the fender.

4. A car fender, comprising a fender, means for holding said fender normally raised, and means for releasing said fender, said releasing means comprising a shaft, depending vertical rods adjustably secured to said shaft, clamps carried on the lower ends of said vertical rods, and a trip rod formed U-shaped at each end and adjustably held in said clamps to obstruct the line of travel of the car.

In testimony whereof I have signed my name to this specification in the presence of two subscribing witnesses.

ALBERT J. THORNLEY.

Witnesses:
   Ada E. Hagerty,
   J. A. Miller.